No. 789,477.

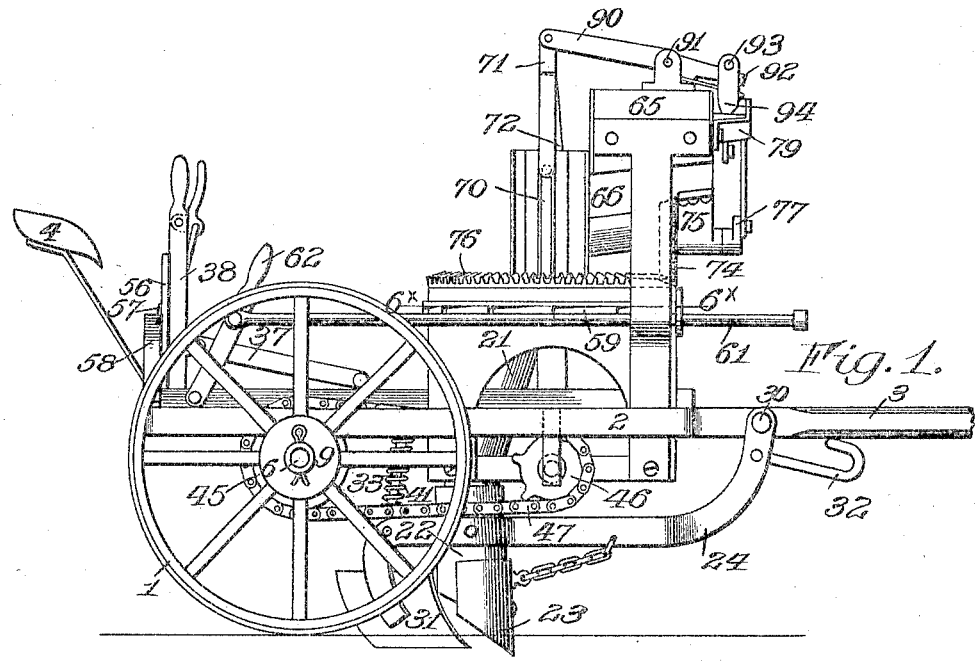

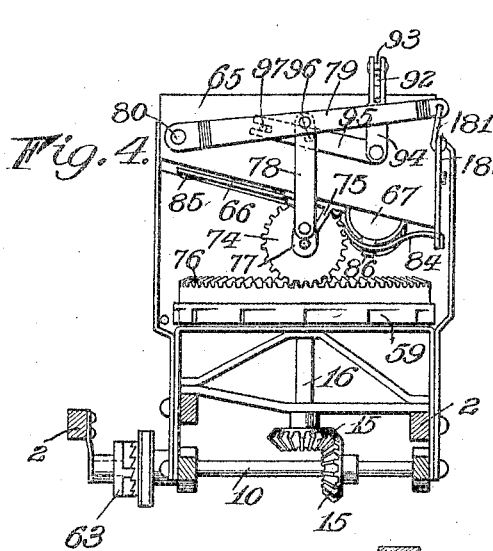

Patented May 9, 1905.

UNITED STATES PATENT OFFICE.

DANIEL L. BAKER, OF SCIO, NEW YORK.

PLANTING-MACHINE.

SPECIFICATION forming part of Letters Patent No. 789,477, dated May 9, 1905.

Application filed October 3, 1904. Serial No. 226,928.

*To all whom it may concern:*

Be it known that I, DANIEL L. BAKER, of Scio, in the county of Allegany and State of New York, have invented certain new and useful Improvements in Planting-Machines; and I do hereby declare the following to be a full, clear, and exact description of the same, reference being had to the accompanying drawings, forming a part of this specification, and to the reference-numerals marked thereon.

My present invention relates to agricultural implements; and it has for its object to provide a machine adapted particularly for planting potatoes and seeds of similar vegetables which are cultivated in hills, and it embodies generally a carriage on which is supported a tool and feeding mechanism adapted to deposit the seeds at regular intervals.

To these and other ends my invention consists in certain improvements and combinations of parts, all as will be hereinafter more fully described, the novel features being pointed out in claims at the end of the specification.

In the drawings, Figure 1 is a side elevation of a planting-machine constructed in accordance with my invention. Fig. 2 is a plan view thereof. Fig. 3 is a longitudinal sectional view of the frame with the hopper removed. Fig. 4 is a front elevation of the hopper and feeding mechanism. Fig. 5 is a detail sectional view of the hopper, taken on the line $5^\times 5^\times$ of Fig. 2. Fig. 6 is a horizontal sectional view taken on the line $6^\times 6^\times$ of Fig. 1. Fig. 7 is a detail sectional view on the line $7^\times 7^\times$ of Fig. 5. Fig. 8 is a view of one end of the hopper, and Fig. 9 is a detail sectional view of one of the bearings.

Similar reference-numerals in the several figures indicate similar parts.

The machine which I have illustrated embodying my invention consists of a carriage embodying the supporting-wheels 1 and the carriage-frame 2, provided at its forward end with a tongue or pole 3 and having at its rear a seat 4 for the operator. At each side of the frame are bearings or journal-boxes 5, in which are supported stud-axles 6, carried by the wheels, said axles extending into and adjustably secured by set-screws 7 on a tubular shaft 8, located between the proximate faces of the bearings 5, an arrangement of parts which permits one or both of the wheels to be adjusted outwardly from the carriage, as may be required when planting seeds in rows of different widths. The wheels are each connected to their respective axles by the usual or any preferred form of ratchet mechanism arranged within the caps 9, as will be understood, so that the shaft 8 will be revolved only when the machine is traveling in a forward direction. Extending transversely of the carriage-frame 2 is a counter-shaft 10, connected, by means of bevel-gears 15, to a vertically-extending shaft 16, attached to a horizontally-revoluble feeding device in the form of a disk 17, arranged above a stationary platform 18 and provided with a series of pockets 19, which are rotated successively over an aperture 20 in the platform, as shown in dotted lines in Fig. 2. Beneath this aperture is a conveyer or tube 21, the end of which projects into a spout 22 in the rear of a furrow-cutting tool or plow 23. The latter is pivotally supported upon a drag-frame 24, being held with its points in operative position by a short chain 25.

The drag-frame is constructed of two parallel bars extending upwardly at their forward ends at opposite sides of the tongue or pole 3, where they are pivoted on a bolt 30, while their opposite extremities project downwardly and support covering-tools 31, having the rearwardly-converging edges operate to form a ridge or hill of earth to close the furrow formed by the tool 23. The draft appliances for the vehicle are attached to a hook or draw-bar 32, connected to the drag-frame beneath the journal 30 in such a position that when the power is applied the frame will have a tendency to move downwardly and retain the tools at its rear end firmly in engagement with the ground. The downward movement of the frame, however, is limited by a bar 33, attached to a bolt or projection 34 and passing loosely through one of the arms of a bell-crank lever 35, said rod being provided with a head or nut 36, preventing its movement in one direction. The other arm of the lever 35 is connected by a link 37 with the lever-arm 38, pivoted to the frame 2, and carrying a latch 39, adapted to coöperate with the teeth of a segment 40. From this construction it will be seen that by adjusting the lever 38 rearwardly the drag-frame may be elevated and that by moving the lever in a forward direction the spring 41, surrounding the rod 33, will be compressed to force the tools downwardly and yieldingly hold them in operative position.

The driving devices for operating the feeding devices consist of sprocket-wheels 45 and 46, arranged upon the shafts 8 and 10, respectively, which are connected by a chain 47. In order that the feed mechanism may be disconnected from the driving-shaft, I mount the sprocket-wheel 45 loosely on the shaft 8, and at one side I arrange a longitudinally-movable clutch member 48, which is secured to the shaft by a key 49. Coöperating with a movable clutch member is an arm 50, carried on an oscillatory shaft 55, journaled in bearings on the frame 2 and provided at its outer end with a handle 56, located in proximity to the seat 4 and adapted to be held in either of the two positions which it may assume by means of a rib or finger 57, engaging notches in a spring-arm 58, as shown particularly in Figs. 2 and 9.

As it is desirable when planting seeds in rows to arrange the deposits in adjacent rows opposite each other, so that a field may be cultivated both longitudinally and transversely, I provide means for adjusting the disk 17 so that each time the operator commences a new row he may aline the seed deposits therein with those of the other rows, this operation being facilitated by some form of marking device. (Not shown.) To this end I provide the disk 17 with ratchet-teeth 59, with which coöperates a spring-pawl 60, carried on a slide-rod 61, operatively connected at its rear end to a lever 62, and I also provide a friction-clutch 63 between the shaft 10 and the sprocket-wheel 46, which may be of any preferred or desired form of construction adapted to permit an independent movement of the shaft 10 when the feed-disk is operated by the pawl 60.

The seeds are contained in a hopper 65, located above the feeding devices, provided with an incline bottom 66, which also inclines to cause the contents to gravitate onto an oscillatory slide 67, arranged beneath an aperture 68 in the hopper-bottom and provided with a cavity or recess forming a tray in which the seeds may be transported to the exterior of the hopper, as indicated in dotted lines of Fig. 5. Located at the rear side of the hopper and in alinement with the slide 67 is a chamber 69, the lower end of which opens above the path described by the pockets 19 in the disk 17, and on the outer surfaces of the side walls are provided ways or channels 70, forming guides for the arms of a yoke 71, carrying a fork or tine 72, which is adapted to be reciprocated vertically and to remove seeds, such as potatoes, from the slide or tray 67 when the latter is projected into the chamber 69. In order to clear the fork of an article impaled thereon, stripping-fingers 73 are arranged as shown in Fig. 5. When the machine is employed for planting seeds such as corn or beans, they are shaken out of the slide or tray, when they fall upon the disk 17 in front of a scraper 80, pivoted to the sides of the chambers, which sweeps them into the pockets 19. Located in the hopper 65 is a door or gate 81, pivoted at 82 above the slide 67, which may be adjusted by an arm 83 to regulate the quantity of seeds passing to the slide, as shown in Fig. 7.

The fork 72 and the slide 67 are operated relatively to each other by means of a pinion 74, journaled on a bracket 75 on the hopper and meshing with the crown gear-teeth 76, provided on the face of the disk 17, said pinion having a crank 77 connected to the pitman 78, attached to the lever 79, pivoted at the point 80. At the outer end of this lever is a link 181, connected to one arm of the bell-crank lever 182, pivoted to the end of the hopper, the other arm of which is attached to a lever 84, pivoted to the bottom of the hopper at the point 85 and having an intermediate point of connection 86 with the lower side of the slide or tray 67. The vertical movement of the fork 72 is accomplished by means of a lever 90, journaled in a bearing 91 and having its end 92 extending beneath a pin 93 in the bifurcated end of a link 94, connected at its lower end to a lever 95, pivoted at 96 and connected to a pin 97 on the lever 79.

A planting-machine embodying my invention is simple in construction, and while it is adapted particularly for planting potatoes it may be employed for planting other kinds of seeds.

I claim as my invention—

1. In a planting-machine, the combination with a carriage embodying wheels and a frame supported thereon, a furrowing-tool and devices in rear of the latter for covering the furrow, of a hopper, a slide operating into and out of the hopper and a device for removing articles from the slide, a stripper coöperating with said device and means for actuating the slide and removing device.

2. In a planting-machine, the combination with a carriage embodying wheels and a frame supported thereon, a furrowing-tool and covering-tools in rear thereof, of a hopper, a rotary feeding member having pockets, a fork for removing articles from the hopper and depositing them in the feeding member and means for rotating the latter and actuating the fork.

3. In a planting-machine, the combination with a carriage embodying wheels and a frame supported thereon, a furrowing-tool and covering-tools in rear thereof, of a hopper, a rotary movable feeding member having pockets and a slide working into and out of the hopper, a fork adapted to remove articles from the slide and deposit them in the feeding member and means for rotating the latter and actuating the slide and fork.

4. In a planting-machine, the combination with a carriage embodying wheels and a frame supported thereon, a furrowing-tool and a conveyer leading to the rear of the tool, of a hopper, a feed-disk having pockets and a driving mechanism for rotating the disk embodying a clutch, a fork adapted to remove articles from the hopper and deposit them in the disk, a device for actuating the fork and means for adjusting the disk independently of the driving mechanism.

5. In a planting-machine, the combination with a carriage embodying wheels and a frame supported thereon, a furrowing-tool and a conveyer leading to the rear of the tool, of a hopper, a feed-disk having pockets registering with the conveyer and provided with ratchet-teeth, and a driving mechanism for the disk embodying a clutch, a fork adapted to remove articles from the hopper and deposit them in the disk, a device for actuating the fork and a manually-operated adjusting device embodying a pawl adapted to engage the disk to adjust it independently of its driving mechanism.

6. In a planting-machine, the combination with a carriage embodying wheels and a frame supported thereon, a furrowing-tool and a counter-shaft on the frame, driving connections between the wheels and the shaft, of a feed-disk rotated by said shaft having pockets, a conveyer leading from beneath the disk to the tool and a hopper arranged above the disk, a fork adapted to remove articles from the hopper and deposit them in the disk and means for actuating the fork.

7. In a planting-machine, the combination with a carriage embodying wheels and a frame supported thereon, a furrowing-tool and a counter-shaft on the frame, driving connections between the wheels and the shaft, of a horizontally-arranged feed-disk driven by the shaft having pockets, a hopper located above the disk, a fork adapted to remove articles from the hopper and deposit them in the disk and devices operated by the disk for actuating the fork.

8. In a planting-machine, the combination with a carriage embodying wheels, a frame supported thereon and a furrowing-tool, a counter-shaft on the frame and driving connections between the wheels and the shaft, of a feed-disk provided with pockets and having gear-teeth thereon, a hopper located above the disk, a fork adapted to remove articles from the hopper and deposit them in the disk and a gear-wheel coöperating with the teeth on the disk and operatively connected to the fork.

9. In a planting-machine, the combination with a carriage embodying wheels and a frame supported thereon, of a furrowing-tool, conveying devices leading thereto and a hopper, a slide arranged therein, a depositing device adapted to remove articles from the slide and place them in the conveying device, and means for operating the slide and depositing device.

10. In a planting-machine, the combination with a carriage embodying wheels and a frame supported thereon, of a furrowing-tool, conveying devices leading thereto and a hopper, a slide arranged therein and a depositing device adapted to remove articles from the slide and place them in the conveying device, means for actuating the slide and depositing device and an adjustable gate in the hopper for regulating the flow of articles to the slide.

11. In a planting-machine, the combination with a carriage embodying wheels and a frame supported thereon, of a furrowing-tool, conveying devices leading thereto and a hopper, a slide arranged therein, a fork adapted to remove articles from the slide and a stripper coöperating therewith and mechanism for causing a relatively timed operation of the slide and fork.

12. In a planting-machine, the combination with a carriage embodying wheels, a driving-axle supported therein and a frame mounted on the axle, of a counter-shaft journaled on the frame, driving mechanism between the two shafts and separate clutches between it and the shafts, feeding devices operated by the counter-shaft, a hopper and means for transferring articles from the latter to the feeding devices.

13. In an agricultural implement, the combination with a frame having bearings thereon and a tubular shaft having its ends abutting the bearings and prevented from longitudinal movement by said bearings, of wheels, stud-axles supported therein and extending into the ends of the shaft, means for attaching them therein and a tool operated by the frame.

14. In an agricultural implement, the combination with a frame having bearings thereon and a tubular shaft having its ends arranged in proximity to said bearings and prevented from longitudinal movement by them, of stud-axles adjustable longitudinally in the shaft, wheels supporting the axles and ratchet connections between said axles and the wheels and a tool operated by the frame.

15. In an agricultural implement, the combination with a carriage comprising wheels and a frame supported thereon having a tongue, of a drag-frame pivotally connected to the carriage, a tool mounted on the drag-frame in rear of the pivotal point of the latter and draft appliances attached to the drag-frame.

16. In an agricultural implement, the combination with a carriage comprising wheels and a frame supported thereon having a tongue, of a drag-frame pivotally connected to the carriage and extending rearwardly, a tool carried by the drag-frame, draft appliances attached to the latter and means for limiting the movement of the drag-frame relatively to the carriage-frame.

17. In an agricultural implement, the combination with a carriage comprising wheels and a frame supported thereon having a tongue, of a drag-frame pivotally connected to the tongue and extending rearwardly beneath the carriage, a tool mounted on the frame and draft appliances connected to the drag-frame below the tongue.

DANIEL L. BAKER.

Witnesses:
W. D. GARDNER,
W. W. BUNNELL.